(12) United States Patent
Dodman et al.

(10) Patent No.: US 10,364,774 B2
(45) Date of Patent: Jul. 30, 2019

(54) DEVICE AND METHOD FOR INTEGRATED ANNULAR LOW PRESSURE GASEOUS FUEL INTRODUCTION

(71) Applicant: CUMMINS INC., Columbus, IN (US)

(72) Inventors: Benjamin Dodman, Daventry (GB); Alan C. Anderson, Columbus, IN (US); Matthew Keith Sease, Columbus, IN (US); Mark T. Stablein, Columbus, IN (US)

(73) Assignee: Cummins Inc., Columbus, OH (US)

( * ) Notice: Subject to any disclaimer, the term of this patent is extended or adjusted under 35 U.S.C. 154(b) by 0 days.

(21) Appl. No.: 15/566,898

(22) PCT Filed: Apr. 14, 2016

(86) PCT No.: PCT/US2016/027479
§ 371 (c)(1),
(2) Date: Oct. 16, 2017

(87) PCT Pub. No.: WO2016/168425
PCT Pub. Date: Oct. 20, 2016

(65) Prior Publication Data
US 2018/0135563 A1    May 17, 2018

Related U.S. Application Data

(60) Provisional application No. 62/149,174, filed on Apr. 17, 2015.

(51) Int. Cl.
*F02M 21/02* (2006.01)
*F02M 25/08* (2006.01)
(Continued)

(52) U.S. Cl.
CPC ............. *F02M 21/029* (2013.01); *F01D 9/04* (2013.01); *F02B 37/00* (2013.01); *F02M 21/04* (2013.01);
(Continued)

(58) Field of Classification Search
CPC ...... F02M 21/029; F02M 21/04; F02M 25/08; F02M 35/10; F01D 9/04; F02B 37/00; F04D 29/4213; F04D 29/705
(Continued)

(56) References Cited

U.S. PATENT DOCUMENTS 4,676,717 A * 6/1987 Willyard, Jr. ........... F01D 9/026
29/402.08
5,408,978 A * 4/1995 Davis ................... F02M 21/045
123/527

(Continued)

FOREIGN PATENT DOCUMENTS

EP    2 386 761    11/2011

OTHER PUBLICATIONS

International Search Report and Written Opinion dated Jul. 26, 2016 in PCT/US2016/027479.

*Primary Examiner* — Syed O Hasan
(74) *Attorney, Agent, or Firm* — Faegre Baker Daniels, LLP

(57) ABSTRACT

A gaseous fuel introducer comprising a first mounting surface shaped and located to couple to a first wall of a charger; a first input, the first input being an air input; a second input, the second input being a gaseous fuel input; and a charge output. The charge output supplies a fuel-containing charge to an input of the charger. The introducer has a first mounting position that defines a first orientation of the second input relative to the charger. The introducer also has a second mounting position that defines a second
(Continued)

orientation of the second input relative to the charger that is different than the first orientation.

19 Claims, 13 Drawing Sheets

(51) Int. Cl.
| | |
|---|---|
| *F01D 9/04* | (2006.01) |
| *F02M 21/04* | (2006.01) |
| *F04D 29/42* | (2006.01) |
| *F02M 35/10* | (2006.01) |
| *F04D 29/70* | (2006.01) |
| *F02B 37/00* | (2006.01) |
| *F02C 7/04* | (2006.01) |
| *F02C 7/22* | (2006.01) |

(52) U.S. Cl.
CPC ............ *F02M 25/08* (2013.01); *F02M 35/10* (2013.01); *F04D 29/4213* (2013.01); *F04D 29/705* (2013.01); *F02C 7/04* (2013.01); *F02C 7/222* (2013.01); *F05D 2220/40* (2013.01); *Y02T 10/144* (2013.01); *Y02T 10/32* (2013.01)

(58) Field of Classification Search
USPC .......................................................... 123/528
See application file for complete search history.

(56) References Cited

U.S. PATENT DOCUMENTS

| | | | |
|---|---|---|---|
| 5,408,979 A * | 4/1995 | Backlund | F02B 33/446 123/562 |
| 2006/0045764 A1* | 3/2006 | Thompson | F01M 13/021 417/313 |
| 2008/0134678 A1* | 6/2008 | Noelle | F01D 25/24 60/605.2 |
| 2014/0010631 A1 | 1/2014 | Khedekar | |
| 2014/0209075 A1* | 7/2014 | Luft | F02M 21/042 123/590 |

* cited by examiner

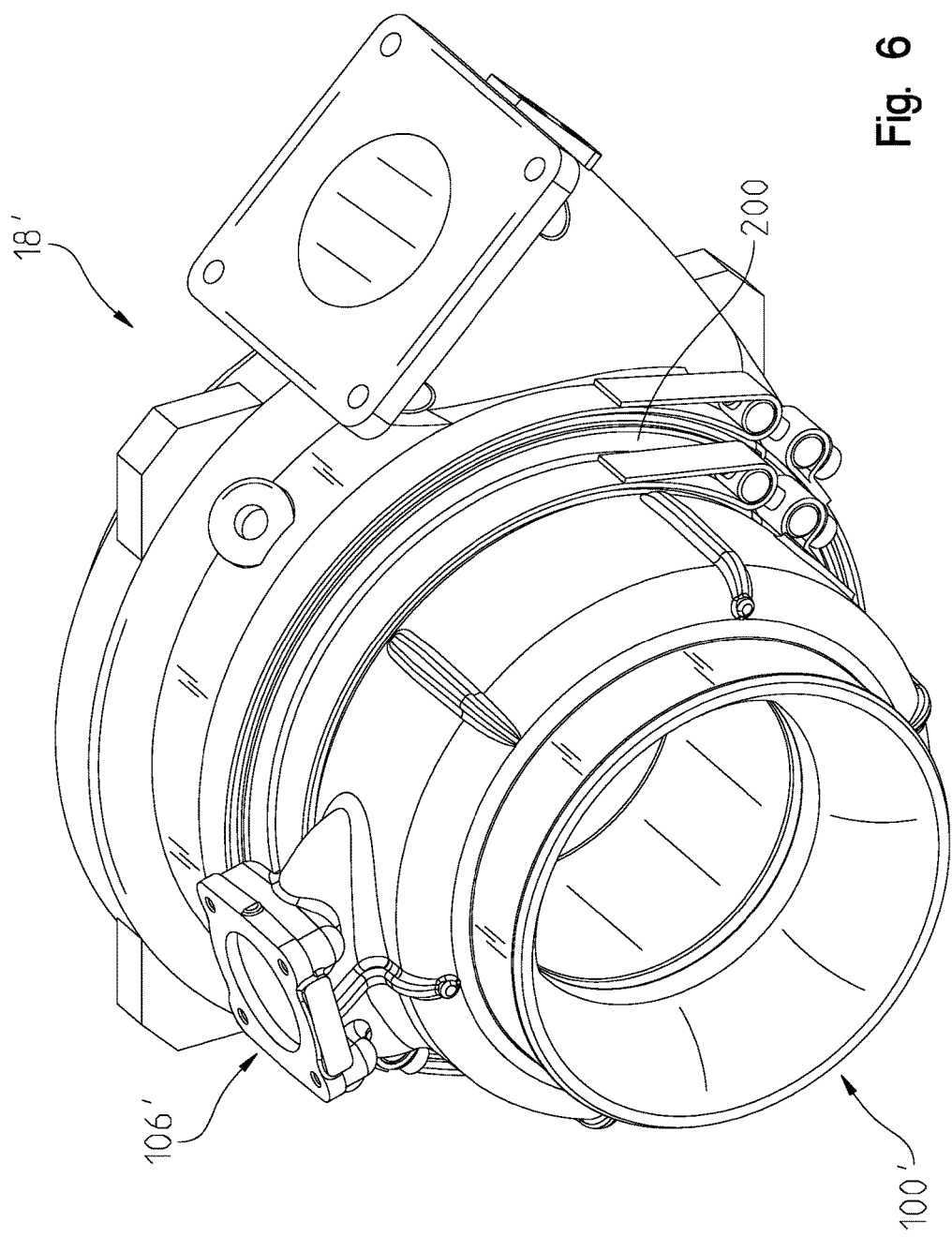

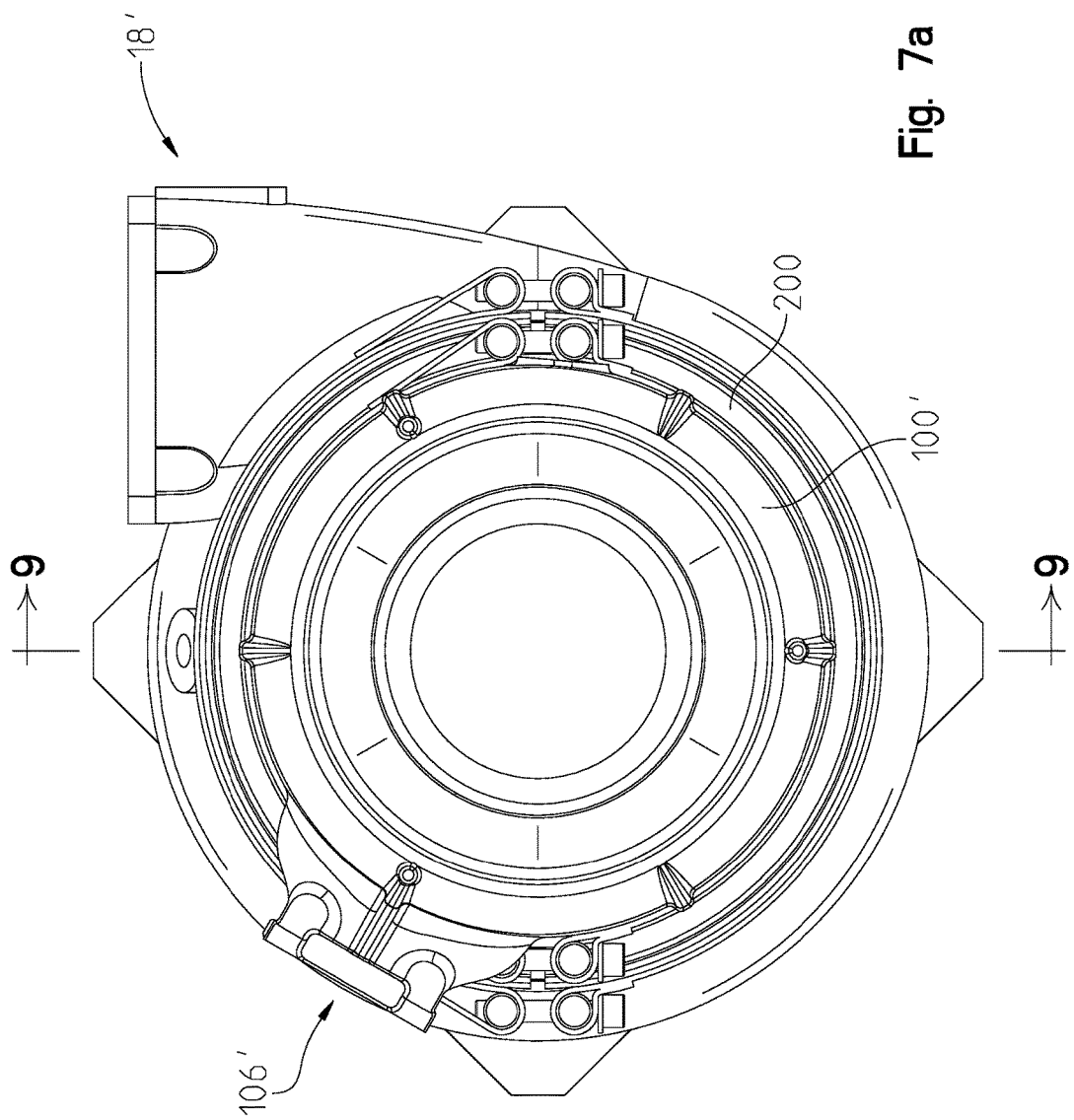

DEVICE AND METHOD FOR INTEGRATED ANNULAR LOW PRESSURE GASEOUS FUEL INTRODUCTION

RELATED APPLICATIONS

The present application is a national phase filing under 35 U.S.C. § 371 of International Application No. PCT/US2016/027479, titled "DEVICE AND METHOD FOR INTEGRATED ANNULAR LOW PRESSURE GASEOUS FUEL INTRODUCTION," filed on Apr. 14, 2016, which claims priority to U.S. Provisional Application No. 62/149,174, which is entitled "DEVICE AND METHOD FOR INTEGRATED ANNULAR LOW PRESSURE GASEOUS FUEL INTRODUCTION," and was filed on Apr. 17, 2015, the entire disclosures of which are expressly incorporated herein by reference in their entireties.

FIELD OF THE DISCLOSURE

The present invention relates generally to systems for introducing fuel to gaseous fueled internal combustion engines, and more specifically to systems for supplying gaseous fuel into a charge flow in a manner that provides a consistent and even distribution therein.

BACKGROUND

Natural gas is sometimes used as a substitute fuel for gasoline and diesel oil. It has the capability of producing less combustion pollutants and for decreasing engine operating costs without complex emission control devices. Its expanded use would also reduce the rate of world fossil fuel consumption.

Proper and complete combustion of natural gas in engines is aided by even distribution of the gaseous fuel (such as natural gas) within the charge air such that multiple cylinders supplied by a common charge source see consistent and equal fueling.

To this end, dedicated, stand-alone mixing elements have been developed that supply the gaseous fuel into the charge radially about a charge supply hose or line (such as a hump hose). These stand-alone elements are relatively bulky and are bolted to the engine or other support structure to consume significant package space. The bolting is typically done via cast connection bores in one or more of the mixing element and the engine housing. These castings create fixed orientations between the mixing element, the engine housing, the gas source, and conduits there-between. Accordingly, each mixing element needs to be custom designed for the engine on which it is to be used such that these pre-cast connections provide proper mounting.

What is therefore needed is a system and method for mixing gaseous fuel that provides a reduced packaging space and provides for flexible orienting of the mixer such that a single unit can be readily customized for use with a plurality of engines and orientations.

SUMMARY

In one embodiment of the present disclosure, a gaseous fuel introducer is provided. The gaseous fuel introducer includes a first mounting surface shaped and located to couple to a first wall of a charger; a first input, the first input being an air input; a second input, the second input being a gaseous fuel input; and a charge output. The charge output supplies a fuel-containing charge to an input of the charger. The introducer has a first mounting position that defines a first orientation of the second input relative to the charger. The introducer also has a second mounting position that defines a second orientation of the second input relative to the charger that is different than the first relationship.

In one aspect of this embodiment, the first mounting surface is an infinitely adjustable mounting surface that permits infinite orientations of the second input relative to the charger. In another aspect, the gaseous fuel introducer further comprises a fixer, wherein the gaseous fuel introducer is rotatable relative to the charger to permit the multiple orientations of the second input and the fixer selectively fixes the relative position of the gaseous fuel introducer and the charger. In yet another aspect, the first wall of the charger is part of a charger insert. In yet another aspect, the second input is in communication with a fuel flow path at least partially defined within a housing of the gaseous fuel introducer, further wherein the fuel flow path encircles the first input. In a variant of this aspect, the fuel flow path provides for annular introduction of fuel into gaseous charge received from the first input.

In another variant, the fuel flow path interfaces with the first input via an annular gap that encircles the first input. In yet another aspect, the gaseous fuel introducer further comprises a fuel flow path from the second input to the charge output, the fuel flow path comprising a first chamber containing a chamber output that directs the gaseous fuel into contact with gas from the first gaseous input. In a variant of this aspect, an input of the first chamber defines a first flow area and the chamber output defines a second flow area that is greater than the first flow area.

In another embodiment of the present disclosure, a device is provided comprising a gaseous fuel introducer comprising a fuel flow path comprising a fuel input; and a charger cooperating with the gaseous fuel introducer to define the fuel flow path within the gaseous fuel introducer. In one aspect of this embodiment, the fuel flow path includes a fuel output where fuel exits the fuel flow path and mixes with air, the charger cooperating with the gaseous fuel introducer to define the fuel output. In another aspect, the charger further includes a charge intake bell having a bell wall, the bell wall forming a wall of the fuel flow path. In a variant of this aspect, the intake bell is removable from the charger. In yet another aspect, the gaseous fuel introducer is rotatable relative to the charger, and rotation of the gaseous fuel introducer changes the position of the fuel input relative to the charger. In yet another aspect, the position of the fuel input of the gaseous fuel introducer is infinitely adjustable relative to the charger.

In yet another embodiment of the present disclosure, a gaseous fuel introducer is provided comprising a housing defining a fuel flow path from a fuel input to a fuel outlet, the housing comprising a mount that couples the housing to a charger such that the charger provides at least one wall that contributes to defining the fuel flow path. In one aspect of this embodiment, the fuel outlet is shaped as a ring. In another aspect, the fuel outlet is defined between the housing and the at least one wall of the charger. In a variant of this aspect, the at least one wall of the charger is an air intake bell wall. In yet another aspect, the housing provides a coupler element that provides for the housing to couple to the charger, the coupler element providing for mounting of the housing to provide for an infinitely adjustable location of the fuel input while maintaining a constant fuel outlet.

BRIEF DESCRIPTION OF THE DRAWINGS

FIG. 6 is a perspective view of a second embodiment integrated gaseous fuel introducer and turbocharger compressor for use with the engine of FIG. 1;

FIGS. 7*a-b* are front and side perspective views of the gaseous fuel introducer and turbocharger of FIG. 6;

DETAILED DESCRIPTION

Figure 1:
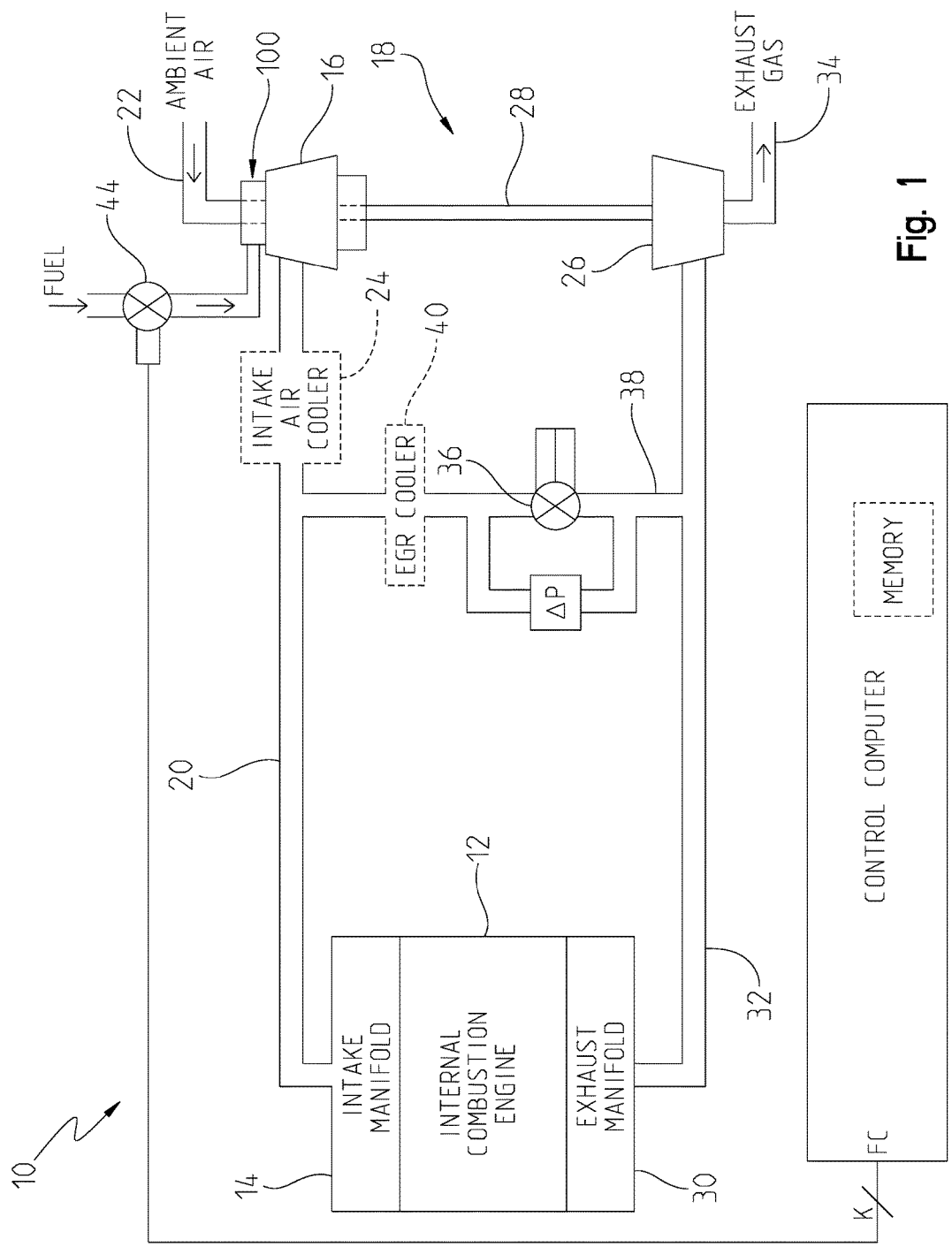
FIG. 1 is a schematic view of an engine using an integrated gaseous fuel introducer and turbocharger compressor.

For the purposes of promoting an understanding of the principles of the invention, reference will now be made to a number of embodiments illustrated in the drawings and specific language will be used to describe the same. It will nevertheless be understood that no limitation of the scope of the invention is thereby intended.

Referring now to FIG. 1, a diagram of one illustrative embodiment of a system 10 for controlling charge flow in a turbocharged internal combustion engine is shown. System 10 includes an internal combustion engine 12 having an intake manifold 14 fluidly coupled to an outlet of a compressor 16 of a turbocharger 18 via an intake conduit 20, wherein the compressor 16 includes a compressor inlet coupled to an intake conduit 22 for receiving fresh ambient air therefrom. Optionally, as shown in phantom in FIG. 1, system 10 may include an intake air cooler 24 of known construction disposed in-line with intake conduit 20 between the turbocharger compressor 16 and the intake manifold 14. Engine 12 is illustratively an engine where the charge (such as air) and fuel is mixed prior to the start of combustion (referred to herein as pre-mixed fuel). Engine 12 is illustratively an engine with in-line cylinders, as shown in FIG. 1. Additionally, while turbocharger 18 is shown, a supercharger or any other gaseous charger may be used in its stead.

The turbocharger compressor 16 is mechanically and rotatably coupled to a turbocharger turbine 26 via a drive shaft 28, wherein turbine 26 includes a turbine inlet fluidly coupled to an exhaust manifold 30 of engine 12 via an exhaust conduit 32, and further includes a turbine outlet fluidly coupled to ambient via an exhaust conduit 34. Optionally, an EGR valve 36 is disposed in-line with an EGR conduit 38 fluidly coupled at one end to the intake conduit 20 and an opposite end to the exhaust conduit 32, and an EGR cooler 40 of known construction may optionally be disposed in-line with EGR conduit 38 between EGR valve 36 and intake conduit 20 as shown in phantom in FIG. 1. Fuel introducer 100 is coupled to turbocharger 18. Fuel introducer 100 is fed fuel as controlled by fuel valve 44. It should be appreciated that one fuel valve 44 may be coupled to multiple fuel introducers for multiple turbocharger 18 and multiple internal combustion engine 12.

Figure 2:
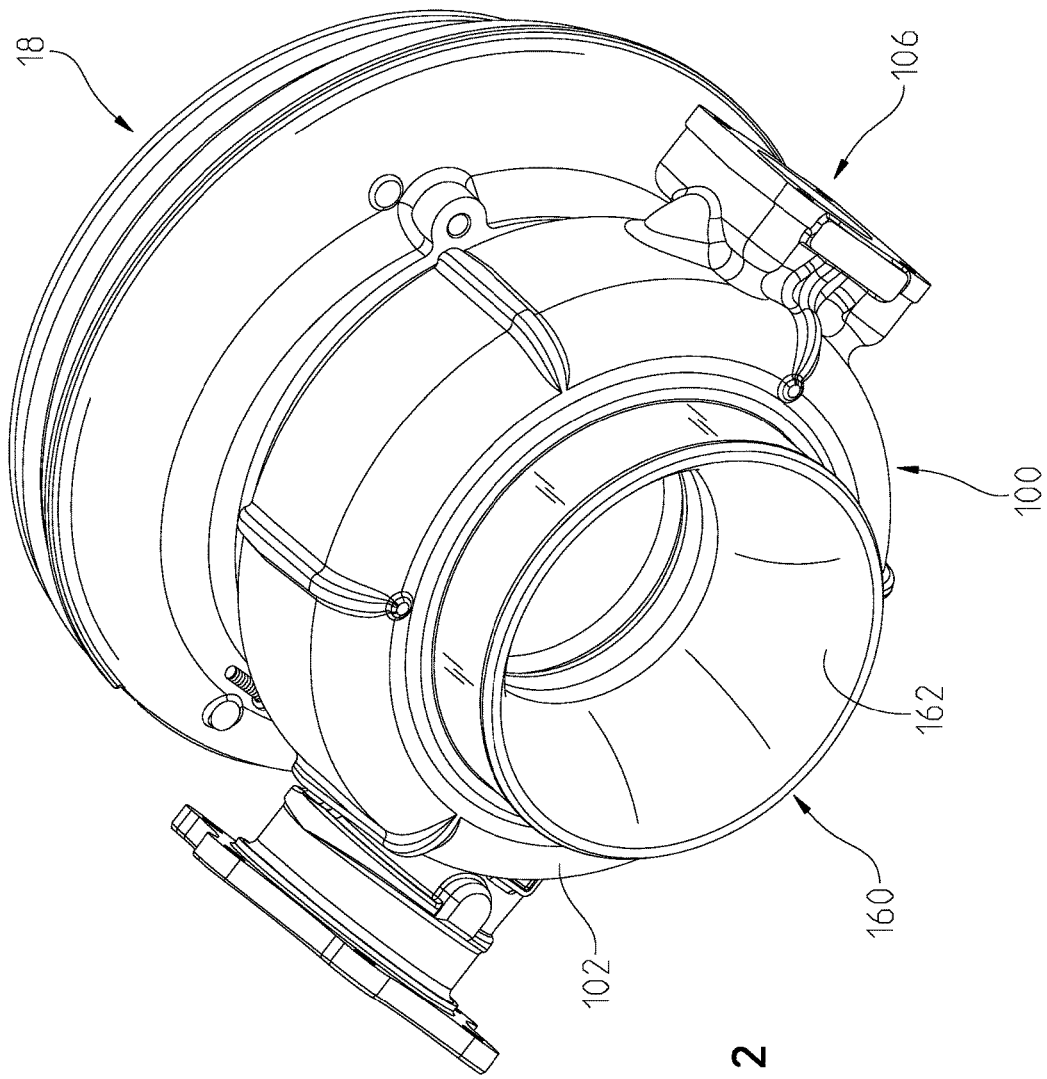
FIG. 2 is a perspective view of a first embodiment integrated gaseous fuel introducer and turbocharger compressor for use with the engine of FIG. 1.
Figure 3A:
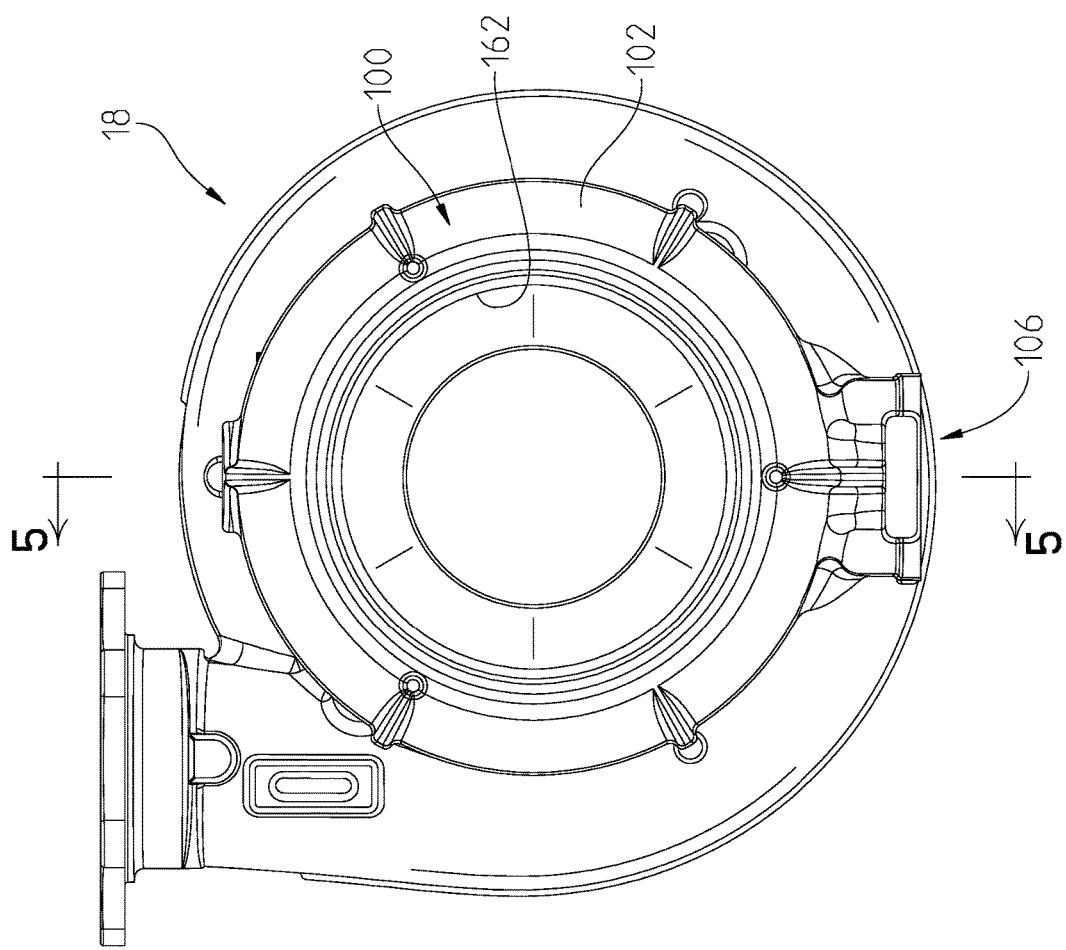
FIGS. 3*a-b* are front and side perspective views of the gaseous fuel introducer and turbocharger of FIG. 2.
Figure 3B:
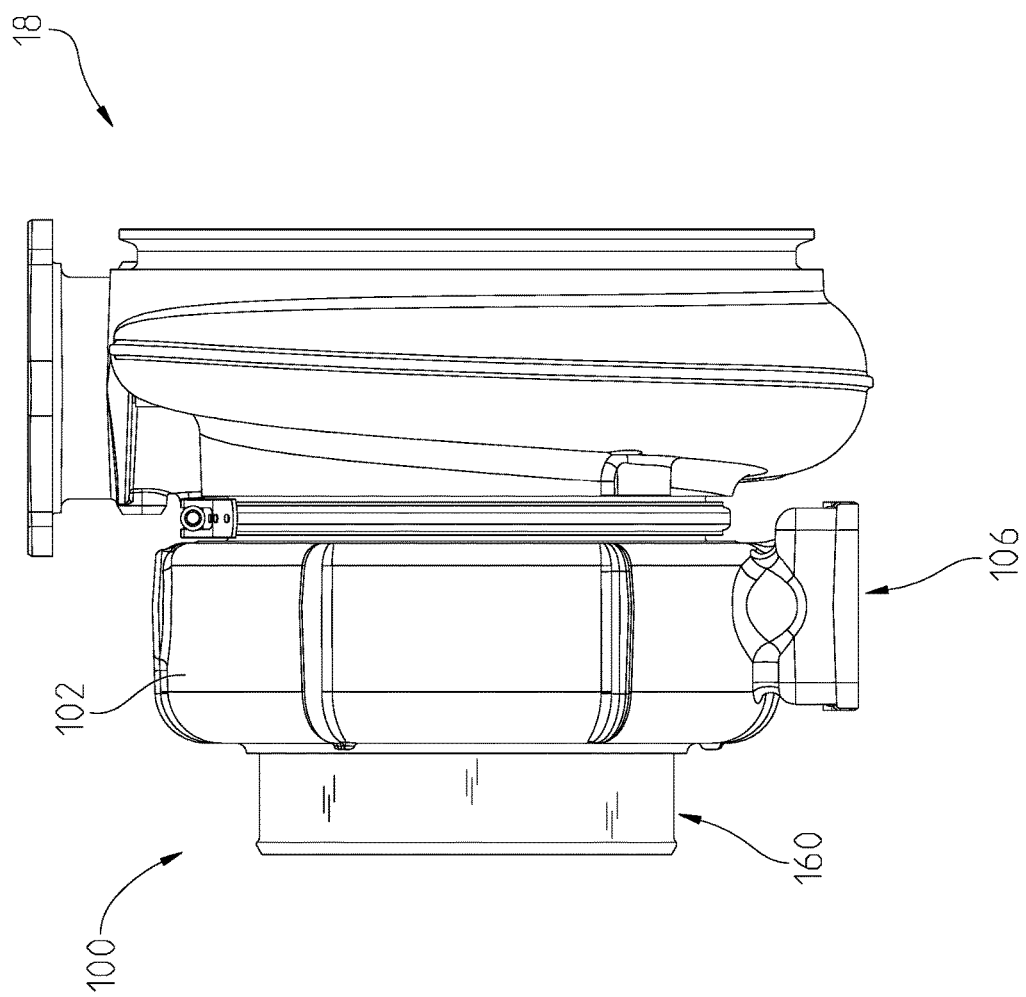
Figure 4:
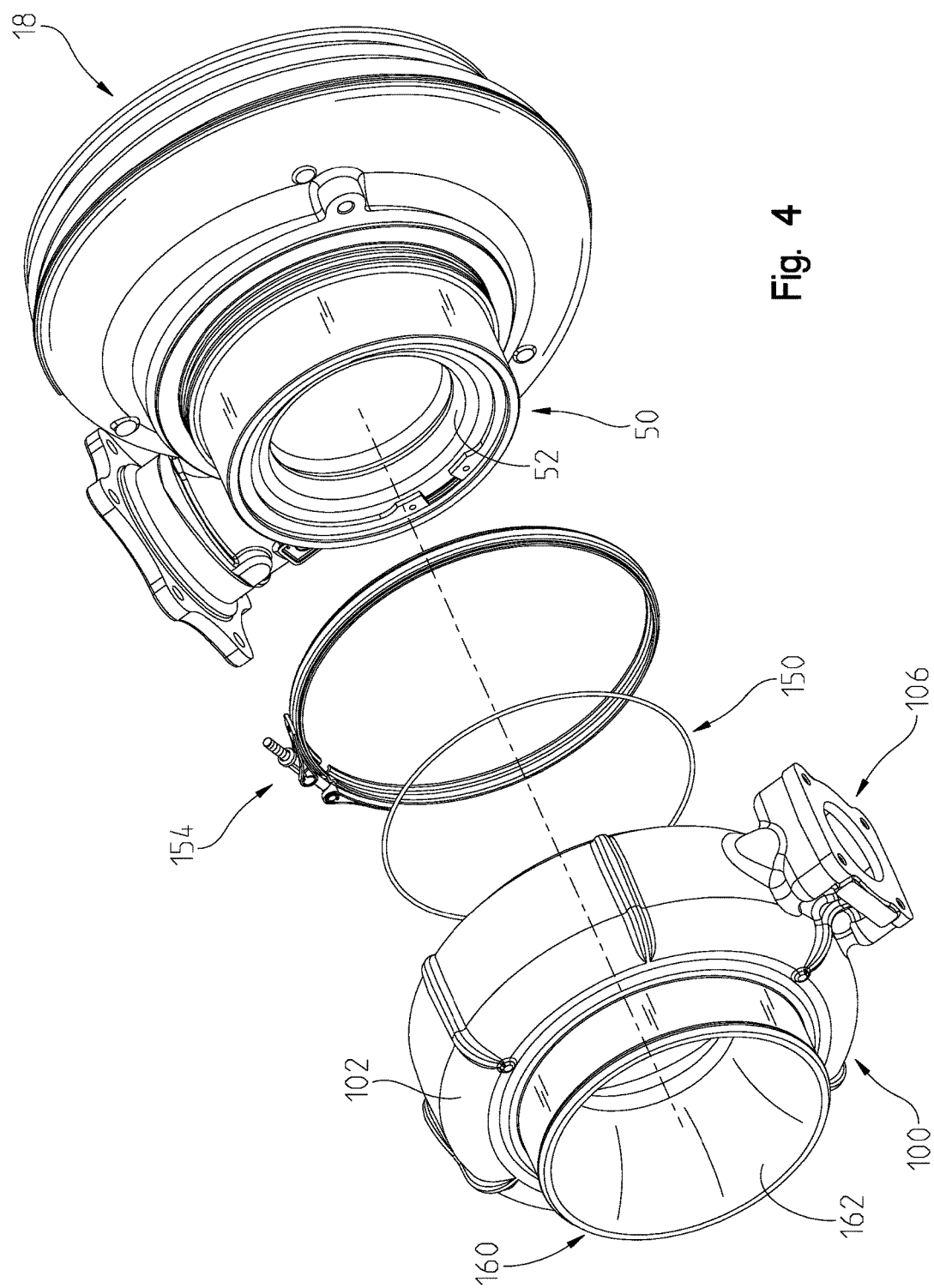
FIG. 4 is an exploded view of the integrated gaseous fuel introducer and turbocharger compressor of FIG. 2.
Figure 5:
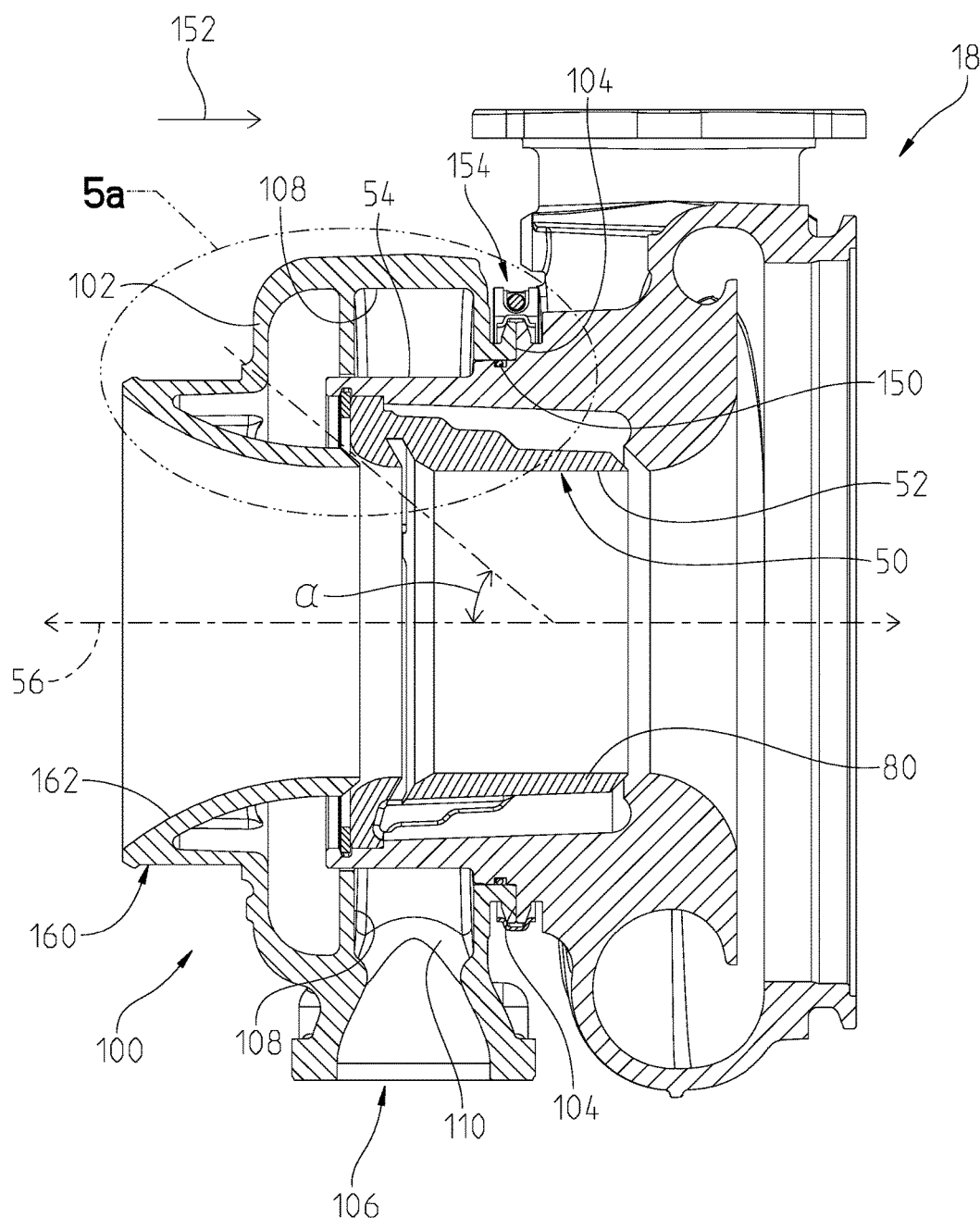
FIG. 5 is a cross sectional view of the integrated gaseous fuel introducer and turbocharger compressor of FIG. 2.
Figure 5A:
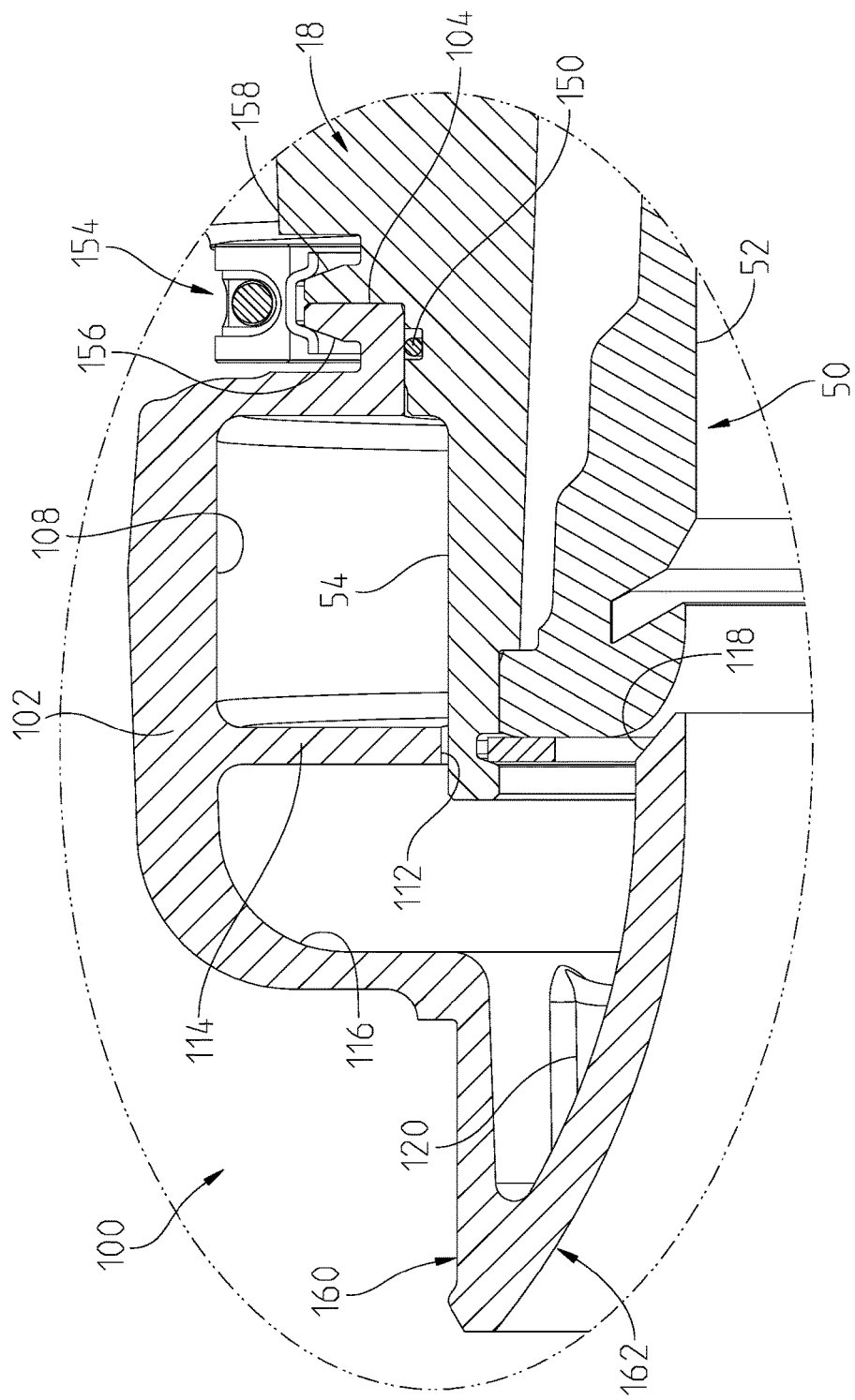
FIG. 5*a* is a view showing increased detail of a portion of the FIG. 5.
Figure 7B:
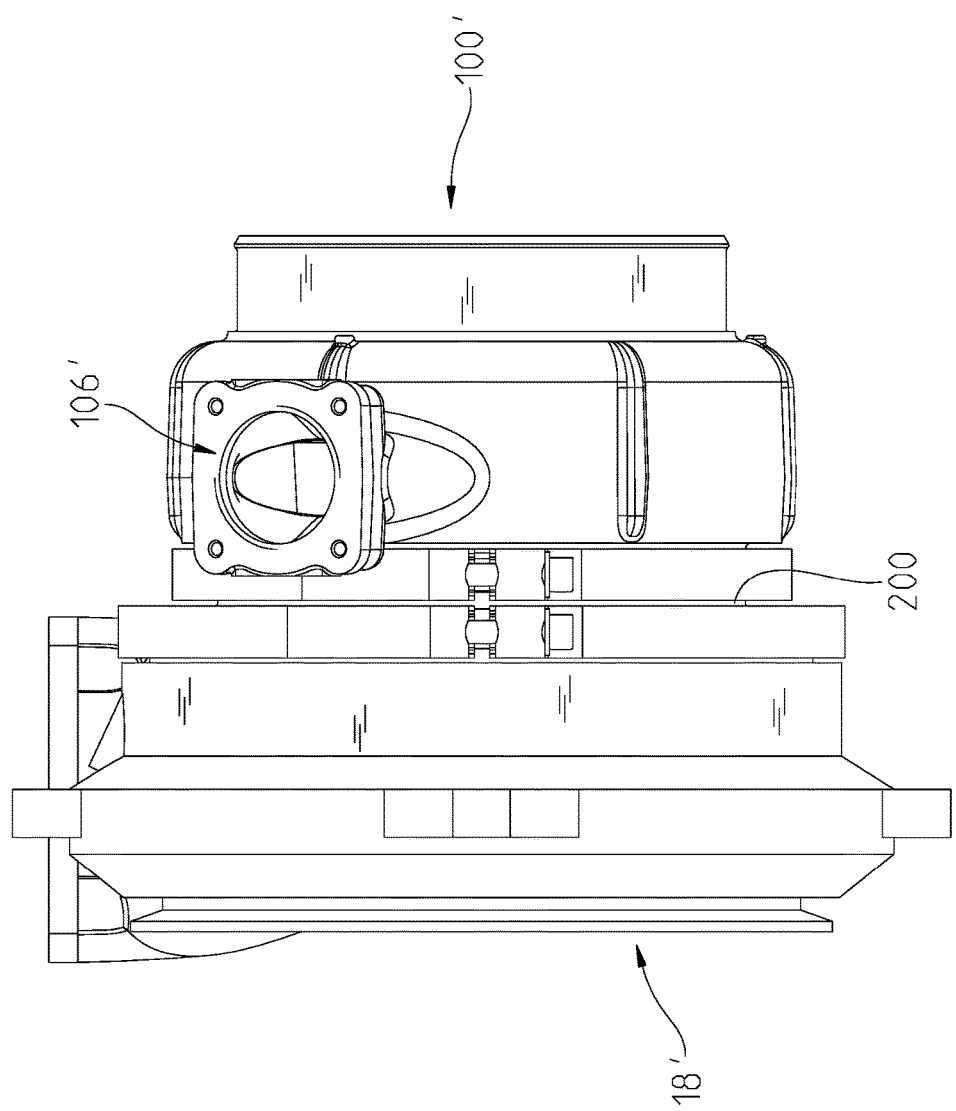
Figure 8:
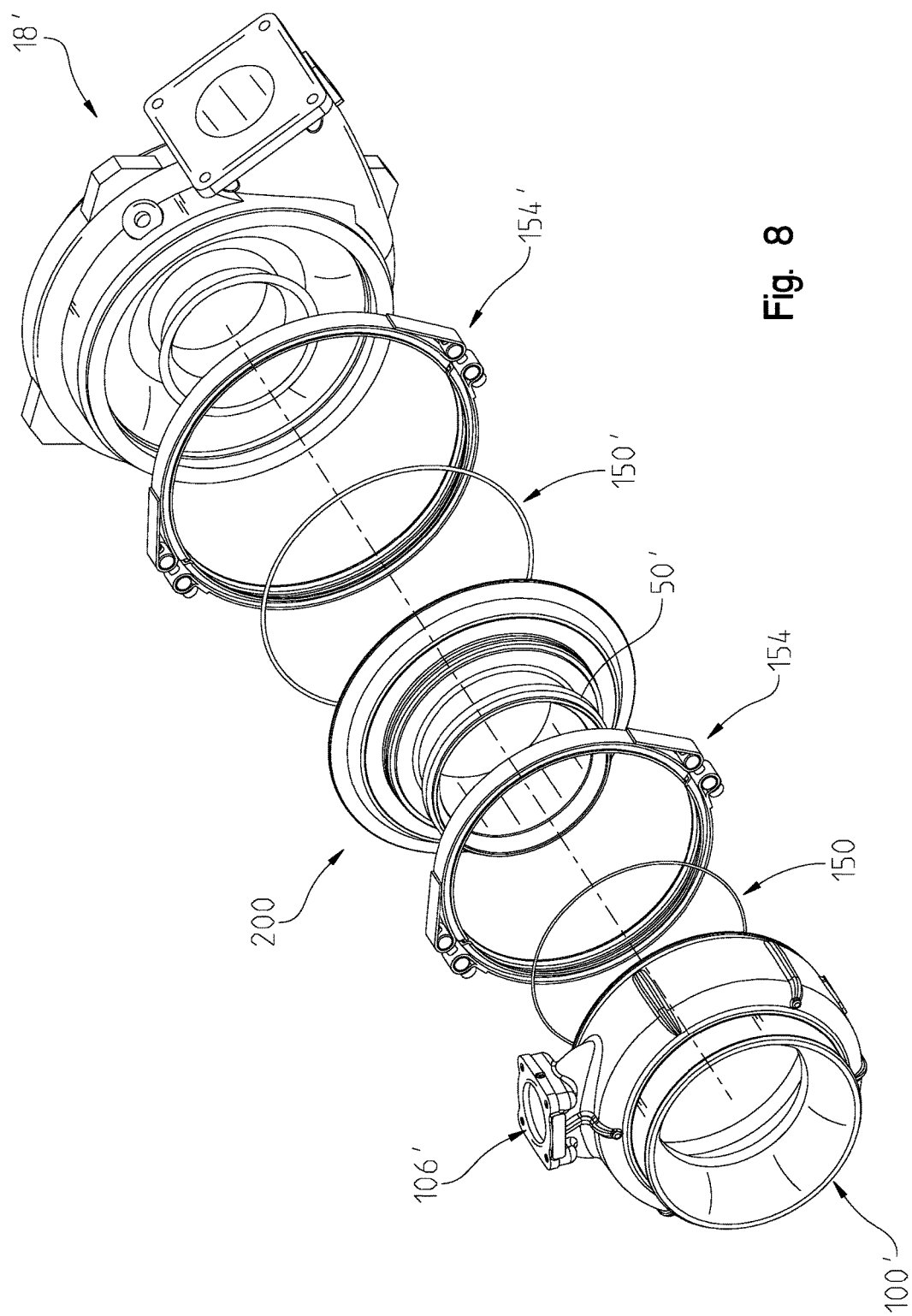
FIG. 8 is an exploded view of the integrated gaseous fuel introducer and turbocharger compressor of FIG. 6.
Figure 9:
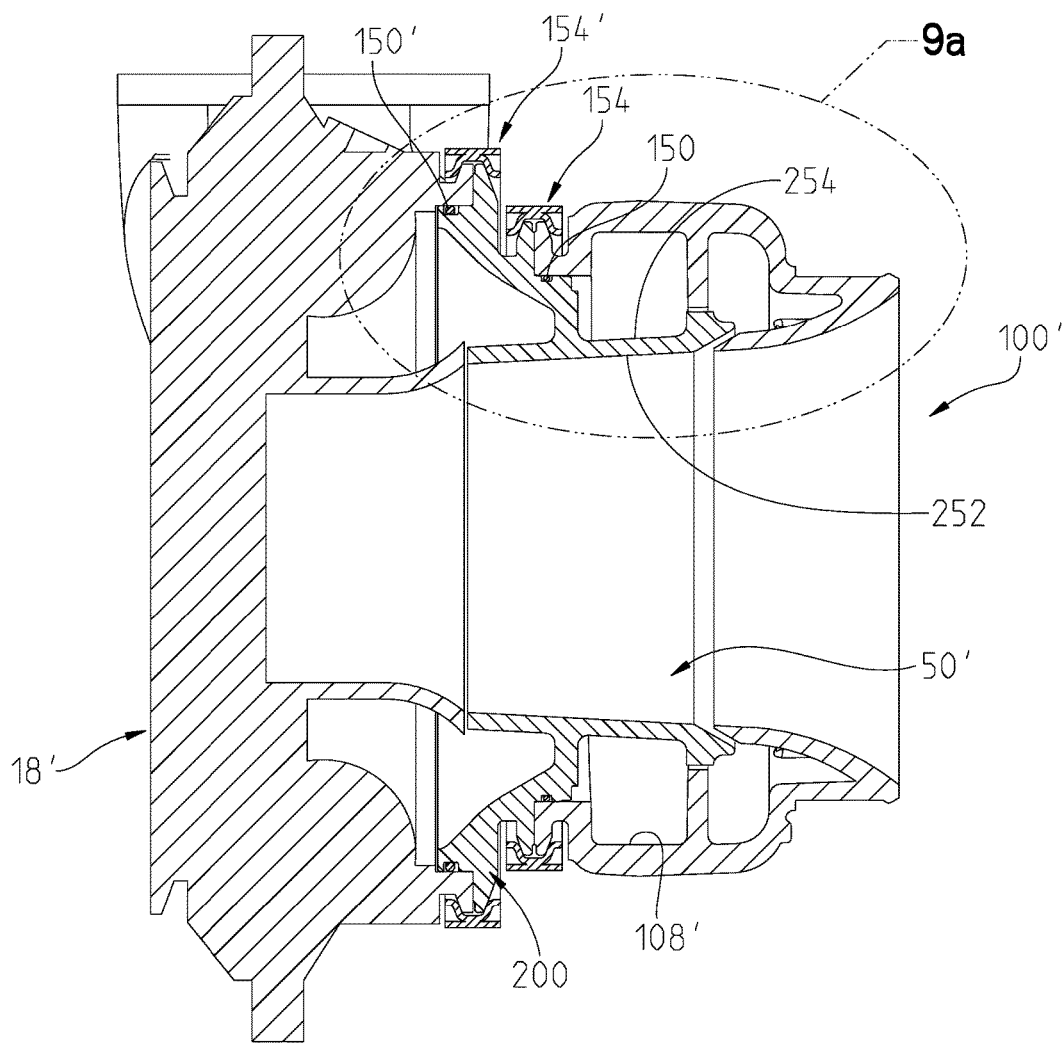
FIG. 9 is a cross sectional view of the integrated gaseous fuel introducer and turbocharger compressor of FIG. 6.
Figure 9A:
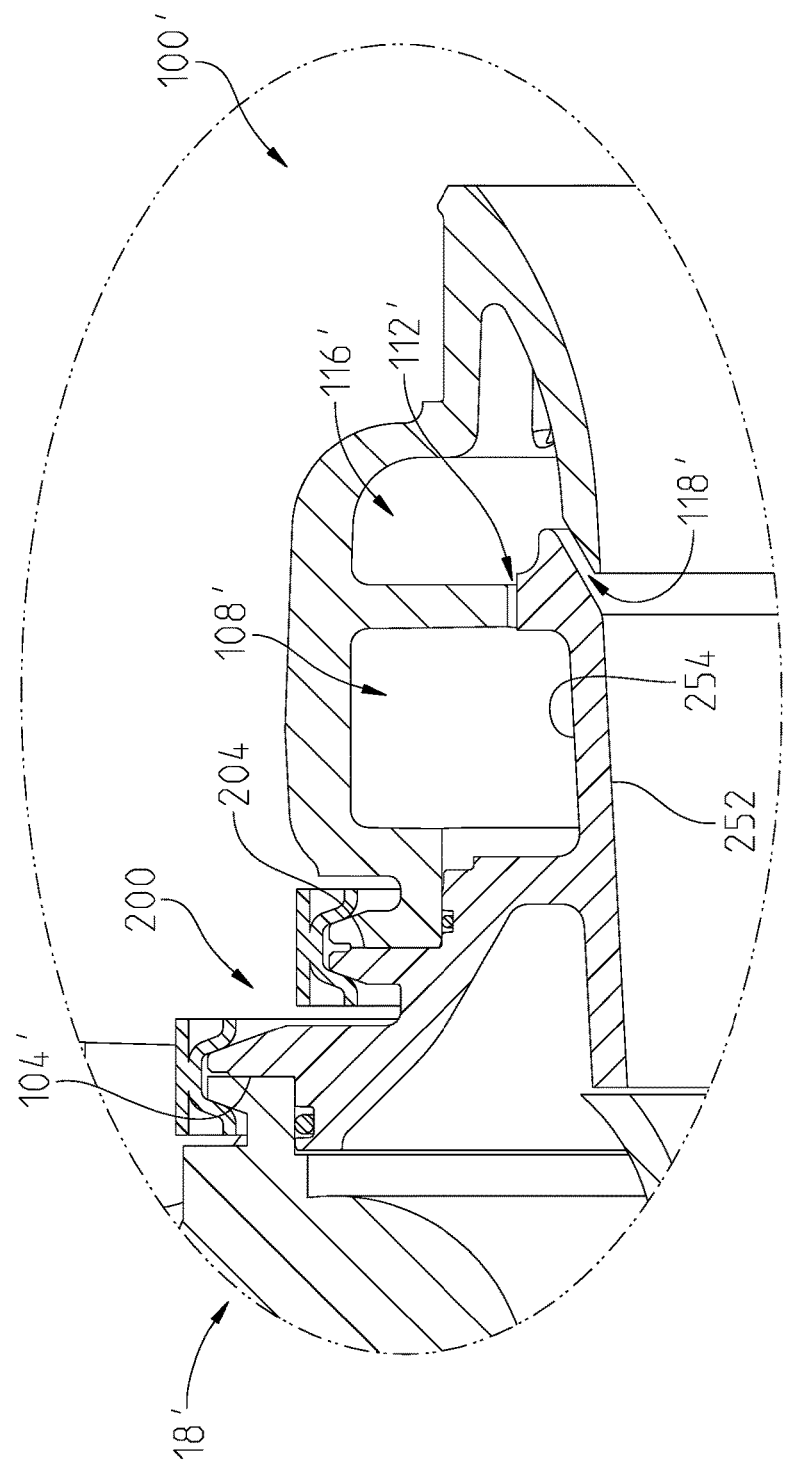
FIG. 9*a* is a view showing increased detail of a portion of the FIG. 9.

FIG. 2 (as well as FIGS. 3*a*, 3*b*, 4, 5*a*) shows a first embodiment annular fuel introducer 100. Introducer 100 includes housing 102 that defines turbocharger interface 104 (FIGS. 5 and 5*a*). Housing 102 further includes a number of chambers that define a flow path for air/charge and for fuel. Turbocharger interface 104 is illustratively a plurality of surfaces (mounting surfaces) that abut or come near turbocharger 18 when introducer 100 is mounted thereon. An annular seal 150 is provided to seal the interface between introducer 100 and turbocharger 18. While annular seal 150 is shown as being disposed on a surface that is parallel with the direction of engagement (152) embodiments are envisioned where annular seal 150 is actually disposed in the adjacent surface that is perpendicular to the direction of engagement 152. Such placement would provide a face seal between fuel introducer 100 and turbocharger 18. Furthermore, embodiments are envisioned that utilize a corner seal.

Marman clamp 154 is provided to engage angled surfaces 156, 158 on fuel introducer 100 and turbocharger 18, respectively. Tightening of Marman clamp 154 pulls angled surfaces 156, 158 together to secure engagement of fuel introducer 100 and turbocharger 18. Marman clamp 154 thus acts as a fixer to fix fuel introducer 100 on turbocharger 18. Furthermore, in at least one embodiment, tightening of Marman clamp 154 acts to squeeze annular seal 150 between fuel introducer 100 and turbocharger 18.

When fuel introducer 100 is so mounted on turbocharger 18, the combination of fuel introducer 100 and compressor inlet 50 of turbocharger 18 combine to define the plurality of chambers of the flow paths for both air/charge and for fuel. Air/charge is commonly provided via a hump hose (not shown) that is seated and secured around bell 160 of fuel introducer 100. Air/charge provided by the hump hose is then channeled through an inner bore 162 of bell 160 (which is contoured to act as a nozzle for desired flow properties), into inner bore 52 of compressor inlet 50 of turbocharger 18. It should be appreciated that the present embodiment shows inner bore 52 of compressor inlet 50 is defined by an insert 80 that allows for ready customization of the contour thereof. Furthermore, it should be appreciated that fuel introducer 100 provides introduction of fuel downstream of the hump hose rather than having the hump hose be an output for or "downstream" of a fuel introducer. Still further, compressor inlet 50 and bell 160 act as air intakes or inputs for their respective parts (turbocharger 18, introducer 100).

Similarly, fuel is supplied to fuel introducer 100 via a hose that is coupled to fuel inlet/input 106, the first portion of a fuel flow path defined by fuel introducer 100. Fuel inlet 106 is sized to have a cross-sectional area that is able to support the greatest possible fuel flow needed for the range of engines upon which fuel introducer 100 is able to be used. The flow path continues via annular volume 108. Fuel inlet 106 is directly coupled to annular volume 108 via transition portion 110. Annular volume 108 encircles external surface 54 of compressor inlet 50. Annular volume 108 has a constant cross-sectional area, except for transition portion 110 that is responsible for transitioning from fuel inlet 106. Transition portion 110 is illustratively an ellipse. The ellipse has the same flow area of inlet 106 so as to not present a choke point relative thereto and to provide continuous smooth flow and to maintain desired flow speeds. The ellipse shape of transition portion 110 further allows a transition from fuel inlet 106 to annular volume 108 in a shorter space than would otherwise be required. Accordingly, the elliptical shape of annular volume 108 contributes to the compact sizing of fuel introducer 100. Annular volume 108 is illustratively defined between fuel introducer 100 and external surface 54 of compressor inlet 50. Annular volume 108 is sized to have a cross-sectional area that is one-half the cross sectional area of fuel inlet 106. This sizing provides that fuel entering annular volume 108 is distributed evenly in both directions to encircle compressor inlet 50.

The fuel flow path then continues via first annular slot 112. Annular slot 112 is defined by a gap between wall 114 and outer surface 54 of compressor inlet 50. The sizing of annular slot 112 is dependent upon the flow capabilities of fuel valve 44. Similarly, the flow capability of fuel valve 44 is dependent upon the properties of the fuel metered thereby. As an example, if the fuel is natural gas, there are many compositions within the spectrum defined as "natural gas." These compositions vary in the energy they contain (generally expressed as BTU's). For a given engine and a given fuel, a mass-flow of said fuel is determined to provide a desired engine operation. More specifically, for a given top-end operation of a given engine, fuel valve 44 is sized to be able to provide adequate fuel to achieve the desired top end performance. The sizing also accounts for whether the given fuel valve 44 is responsible for feeding one fuel introducer 100 or multiple fuel introducer 100. The sizing of annular slot 112 is provided such that its full cross-sectional area (perpendicular to the flow direction, which presents as a ring) is slightly larger than the cross sectional area of a "full-open" setting of fuel valve 44. It should be appreciated that when fuel valve 44 is feeding multiple fuel introducer 100, the sum of the areas of the annular slots 112 of all fed fuel introducer 100 is the amount that is slightly larger than the effective cross sectional area ("flow areas") of a "full-open" setting of fuel valve 44.

It should be appreciated that the length of wall 114 is altered (machined) to achieve the differing sizing of first annular slot 112. As such, the sizing of first annular slot 112 is not the most restrictive element in the flow path of the fuel (fuel valve 44 is necessarily more restrictive). It should be further appreciated that making first annular slot 112 much larger than its respective portion of the flow-area of fuel valve 44 would allow a disproportionate amount of fuel to traverse the portion of first annular slot 112 proximate fuel inlet 106 rather than urging the fuel to fill annular volume 108 and provide a more annularly-uniform distribution of fuel within annular volume 108 and through first annular slot 112. In the present example, the flow area of first annular slot 112 is approximately 5% larger than the flow area proscribed by the full open setting of fuel valve 44.

After traversing first annular slot 112, the fuel flow path continues into second annular volume 116. Second annular volume 116 is defined between housing 102 and compressor inlet 50. The cross sectional area of second annular volume 116 is illustratively at least 40% of the cross sectional area of annular volume 108. Second annular volume 116 receives flow via first annular slot 112 from annular volume 108. It should be appreciated that while the flow is primarily in the direction directly from annular volume 108 to first annular slot 112 (opposite direction 152), there is a portion of the flow that continues to move annularly due to the flow within annular volume 108 originating at fuel inlet 106. Second annular volume 116 acts as a buffer that receives the flow via first annular slot 112 and responsively urges fuel held within second annular volume 116 out of second annular slot 118. Second annular slot 118 operates as an output of second annular volume 116. The flow out of second annular slot 118 is less likely to have the annularly directed component in that the flow is turned approximately 135-degrees. As such, there is no linear flow path that would be likely to sustain the inertia of a flow having an annularly directed portion. As such, flow provided to second annular slot 118 is in a direction that is primarily free from an annular (circumferential) component.

Accordingly, as fuel traverses second annular slot 118 into inner bore 162 of bell 160, a more evenly distributed fuel flow is provided thereto. Thus, a more even distribution of fuel within the charge flow is achieved. A more even fuel distribution presents a more even combustion rather than a varying combustion which can present loads on the engine (such as cyclical fatiguing loads on a compressor wheel/blade). It should be further understood that an area just outside of second annular slot 118 acts as an output of introducer 100 that provides a fuel-containing charge to compressor inlet 50 which is an input of charger 18. As also shown in FIG. 5a, internal ribs 120 are located within second annular volume 116. Ribs 120 help to stiffen bell 160 and also serve to reduce circumferential flow of fuel within second annular volume 116. Thus, ribs 120 also aid in the even distribution of fuel into inner bore 162.

As previously noted, the fuel flow path continues from second annular volume 116 through second annular slot 118. Second annular slot 118 is generally oriented at an angle (a) relative to central axis 56 of compressor inlet 50 that generally represents the direction of flow of air/charge in compressor inlet 50. The angle of second annular slot 118 is chosen to provide that incoming fuel mixes with air with a low amount of turbulence. Like first annular slot 112, second annular slot 118 presents a width defined by the gap between housing 102 and compressor inlet 50. The sizing of second annular slot 118 is chosen to be between 20-30% more than the area defined by first annular slot 112. In one embodiment, the flow area of second annular slot 118 is 25% greater than the flow area of first annular slot 112. Flow areas of second annular slot 118 are envisioned as low as 5% greater than the flow area of first annular slot 112 and bounded on an upper end by the flow area that is still able to maintain substantially uniform flow around the full circumference. The increase in flow area from first annular slot 112 to second annular slot 118 again ensures that downstream elements do not provide a choke point or restriction relative to first annular slot 112 or fuel valve 44. Also, it should be appreciated that as fuel progresses down a flow path, the pressure drops. The increase in flow area at least partially offsets the reduced pressure to achieve a more uniform flow.

Again, second annular slot 118 assumes approximately a 45-degree angle relative to the air/charge flow. Embodiments are envisioned having an even smaller angle in that a smaller angle is more in-line with the flow of the air/charge and is therefore less likely to present disruption and/or turbulence. Again, the angled (non-perpendicular) introduction of fuel into the air/charge flow provides increased uniformity of the fuel mixing.

It should be appreciated that the nature of the interface of fuel introducer 100 to turbocharger 18 allows fuel introducer 100 to be rotated relative thereto. Again, Marman clamp 154 is tightened to secure fuel introducer 100 to turbocharger 18. Accordingly, a single design of fuel introducer 100 provides flexibility to receive a fuel hose coming from any direction rather than requiring customized forming of fuel introducer 100 or special routing of a fuel hose. For a given position of turbocharger 18 with particular locations of charge output and exhaust intake, the orientation of fuel introducer 100 (specifically of fuel inlet 106) is infinitely adjustable. Fuel introducer 100 is rotatable relative to turbocharger 18 to allow an infinite number of angle orientations for fuel inlet 106 on turbocharger 18. For example, fuel introducer 100 may have a first mounting position that defines a first orientation of fuel inlet 106 relative to turbocharger 18, and fuel introducer 100, once rotated, may have a second mounting position that defines a second orientation of fuel inlet 106 relative to turbocharger 18 that is different than the first orientation.

For a given application on a specific engine, it is anticipated that a specific known angle will be desired. Accordingly, embodiments are envisioned where a flat surface will be provided on an exterior surface of housing 102. This surface (not shown) would be positioned such that it would be level when fuel introducer 100 is positioned properly (rotationally) on turbocharger 18. As such, an installer could place a level (bubble level, spirit level, etc.) on the level surface to be able to confirm proper orientation of fuel introducer 100 on turbocharger 18. Once proper orientation is achieved, Marman clamp 154 is tightened to lock placement. Similarly, other indexing elements, such as indexing marks may be cast or otherwise placed on fuel introducer 100 to allow a desired rotational position to be ascertained by matching up with similar marks on turbocharger 18 or otherwise.

Still further, because compressor inlet 50 forms walls of chambers (volumes) 108, 116, of fuel introducer 100, fuel introducer 100 takes up less room than a separate dedicated fuel introducer. The described orientation further eliminates a need for a hose from an output of fuel introducer 100 to compressor inlet 50. The present design thus is a compact design that is efficient with respect to use of space within an engine housing.

Also, the connection of fuel introducer 100 to turbocharger 18 provides all the connection support needed to mount fuel introducer 100. Stated differently, fuel introducer 100 does not require a separate linking or support for its mounting within an engine housing.

A second embodiment fuel introducer 100' is shown in FIGS. 6-9a. The primary difference between the two exemplary embodiments, is that the second embodiment turbocharger 18' includes an adapter/insert 200. Adapter 200 includes inlet duct 50'. Like compressor inlet 50, at least one portion of inlet duct 50' acts as a wall (254) that contributes to defining a fuel flow path. Whereas introducer 100 has a fixed outer wall 54 and receives an insert 80 to customize the inner bore 52, introducer 200 provides adapter 200 that provides for customization of both outer wall 254 and inner bore 252. Adapter 200 includes turbocharger interface 104' that couples to turbocharger 18' via Marman clamp 154 and seal 150. Adapter 200 further includes introducer interface 204 that couples to introducer 100' via Marman clamp 154' and seal 150'. Adapter 200 provides for customization of inlet duct 50' for various desired uses.

Again, introducer 100' includes various walls to provide a fuel inlet 106', first annular volume 108', first annular slot 112', second annular volume 116', and second annular slot 118'. Each of fuel inlet 106', first annular volume 108', first annular slot 112', second annular volume 116', and second annular slot 118' are all formed using the same considerations as to sizings and functions as described with respect to first embodiment introducer 100.

The above detailed description and the examples described therein have been presented for the purposes of illustration and description only and not for limitation. For example, the operations described may be done in any suitable manner. The method steps may be done in any suitable order still providing the described operation and results. It is therefore contemplated that the present embodiments cover any and all modifications, variations or equivalents that fall within the spirit and scope of the basic underlying principles disclosed above and claimed herein.

What is claimed is:

1. A gaseous fuel introducer for an internal combustion engine comprising: a first mounting surface shaped and located to couple to a first wall of a charger; a first input, the first input being an air input; a second input, the second input being a gaseous fuel input; and a charge output, the charge output supplying a fuel-containing charge to an input of the charger; the introducer having a first mounting position that defines a first orientation of the second input relative to the charger, the introducer having a second mounting position that defines a second orientation of the second input relative to the charger that is different than the first orientation, wherein the second input is in communication with a fuel flow path at least partially defined within a housing of the gaseous fuel introducer, and the fuel flow path interfaces with the first input via an annular gap that encircles the first input, the annular gap being defined by a space between a second wall extending from the housing and an outer surface of the first input.

2. The gaseous fuel introducer of claim 1, wherein the first mounting surface is an infinitely adjustable mounting surface that permits infinite orientations of the second input relative to the charger.

3. The gaseous fuel introducer of claim 1, further comprising a fixer, wherein the gaseous fuel introducer is rotatable relative to the charger to permit the multiple orientations of the second input and the fixer selectively fixes the relative position of the gaseous fuel introducer and the charger.

4. The gaseous fuel introducer of claim 1, wherein the first wall of the charger is part of a charger insert.

5. The gaseous fuel introducer of claim 1, wherein the fuel flow path encircles the first input.

6. The gaseous fuel introducer of claim 1, wherein the fuel flow path provides for annular introduction of fuel into gaseous charge received from the first input.

7. The gaseous fuel introducer of claim 1, wherein the fuel flow path includes a first chamber containing a chamber output that directs the gaseous fuel into contact with gas from a first gaseous input.

8. The gaseous fuel introducer of claim 7, wherein an input of the first chamber defines a first flow area and the chamber output defines a second flow area that is greater than the first flow area.

9. A device for an internal combustion engine comprising; a gaseous fuel introducer having a first input being an air input, and a fuel flow path including a fuel input; and a charger cooperating with the gaseous fuel introducer to define the fuel flow path within the gaseous fuel introducer, wherein the fuel flow path at least partially defined within a housing of the gaseous fuel introducer interfaces with the first input via an annular gap that encircles the first input, the annular gap being defined by a space between a wall extending from the housing and an outer surface of the first input.

10. The device of claim 9, wherein the fuel flow path includes a fuel output where fuel exits the fuel flow path and mixes with air, the charger cooperating with the gaseous fuel introducer to define the fuel output.

11. The device of claim 9, wherein the charger further includes a charge intake bell having a bell wall, the bell wall forming a wall of the fuel flow path.

12. The device of claim 11, wherein the intake bell is removable from the charger.

13. The device of claim 9, wherein the gaseous fuel introducer is rotatable relative to the charger, and rotation of the gaseous fuel introducer changes the position of the fuel input relative to the charger.

14. The device of claim 9, wherein the position of the fuel input of the gaseous fuel introducer is infinitely adjustable relative to the charger.

15. A gaseous fuel introducer for an internal combustion engine comprising: a housing defining a fuel flow path from a fuel input to a fuel outlet, the housing having a mount that couples the housing to a charger such that the charger provides at least one wall that contributes to defining the fuel flow path, wherein the fuel flow path interfaces with an air input associated with the gaseous fuel introducer via an annular slot that encircles the air input, the annular slot being defined by a space between a wall extending from the housing and an outer surface of the air input.

16. The gaseous fuel introducer of claim 15, wherein the fuel outlet is shaped as a ring.

17. The gaseous fuel introducer of claim 15, wherein the fuel outlet is defined between the housing and the at least one wall of the charger.

18. The gaseous fuel introducer of claim 17, wherein the at least one wall of the charger is an air intake bell wall.

19. The gaseous fuel introducer of claim 15, wherein the housing provides a coupler element that provides for the housing to couple to the charger, the coupler element providing for mounting of the housing to provide for an infinitely adjustable location of the fuel input while maintaining a constant fuel outlet.

* * * * *